United States Patent
Parmar et al.

(10) Patent No.: US 12,462,069 B2
(45) Date of Patent: Nov. 4, 2025

(54) METHOD AND A SYSTEM FOR CHECKING OWNERSHIP AND INTEGRITY OF AN AI MODEL USING DISTRIBUTED LEDGER TECHNOLOGY (DLT)

(71) Applicants: Robert Bosch GmbH, Stuttgart (DE); Robert Bosch Engineering and Business Solutions Private Limited, Bangalore (IN)

(72) Inventors: Manojkumar Somabhai Parmar, Ahmedabad (IN); Shrey Arvind Dabhi, Gujarat (IN); Sunder Naik Anjali, Bangalore (IN); Mayurbhai Thesia Yash, Gujarat (IN)

(73) Assignees: Robert Bosch GmbH, Stuttgart (DE); Robert Bosch Engineering and Business Solutions Private Limited, Bangalore (IN)

(*) Notice: Subject to any disclaimer, the term of this patent is extended or adjusted under 35 U.S.C. 154(b) by 125 days.

(21) Appl. No.: 18/694,126

(22) PCT Filed: Jul. 15, 2022

(86) PCT No.: PCT/EP2022/069875
§ 371 (c)(1),
(2) Date: Mar. 21, 2024

(87) PCT Pub. No.: WO2023/001708
PCT Pub. Date: Jan. 26, 2023

(65) Prior Publication Data
US 2024/0403493 A1 Dec. 5, 2024

(30) Foreign Application Priority Data
Jul. 19, 2021 (IN) .......................... 2021 4103 2309

(51) Int. Cl.
*G06F 21/64* (2013.01)
*G06F 21/16* (2013.01)
(Continued)

(52) U.S. Cl.
CPC .............. *G06F 21/64* (2013.01); *G06F 21/16* (2013.01); *G06N 3/08* (2013.01); *G06N 20/10* (2019.01);
(Continued)

(58) Field of Classification Search
None
See application file for complete search history.

(56) References Cited

U.S. PATENT DOCUMENTS

2004/0249480 A1* 12/2004 Lefebvre ................ G06V 10/82
700/52
2019/0034763 A1* 1/2019 Guim Bernat ...... H04L 41/5003
(Continued)

FOREIGN PATENT DOCUMENTS

CN 112650985 A * 4/2021 ............. G06N 20/00
CN 113497784 A * 10/2021 ............. G06N 20/00

OTHER PUBLICATIONS

International Search Report corresponding to PCT Application No. PCT/EP2022/069875, mailed Nov. 4, 2022 (English language document) (4 pages).
(Continued)

*Primary Examiner* — Ali H. Cheema
(74) *Attorney, Agent, or Firm* — Maginot, Moore & Beck LLP

(57) ABSTRACT

A method is for checking an integrity of an artificial intelligence (AI) model using distributed ledger technology (DLT). The method leverages state-of-the-art watermarking mechanism and ties it up with DLT to generate proof of origin (provenance) in a tamper-proof way. The AI model is
(Continued)

registered on the distributed ledger (DL) by uploading a full checksum, a selective checksum, watermark data, and at least a predefined output of the watermark data. A unique model ID is received upon registration. The ownership and integrity of AI model is then determined by matching the model and the output of the watermark data followed by verification of the full checksum and the selective checksum of the AI model.

10 Claims, 2 Drawing Sheets

(51) Int. Cl.
*G06N 3/08* (2023.01)
*G06N 20/10* (2019.01)
*H04L 9/08* (2006.01)
*H04L 9/32* (2006.01)

(52) U.S. Cl.
CPC .......... *H04L 9/0897* (2013.01); *H04L 9/3239* (2013.01); *H04L 9/3247* (2013.01)

(56) References Cited

U.S. PATENT DOCUMENTS

| | | |
|---|---|---|
| 2019/0370440 A1 | 12/2019 | Gu et al. |
| 2020/0320417 A1* | 10/2020 | Corning ............... G06F 21/85 |
| 2021/0109790 A1* | 4/2021 | Cheng ............... G06F 21/1063 |
| 2021/0109792 A1* | 4/2021 | Cheng ............... G06F 21/16 |
| 2021/0109793 A1* | 4/2021 | Cheng ............... G06F 21/16 |
| 2021/0110312 A1* | 4/2021 | Cheng ............... H04L 9/3239 |
| 2021/0149733 A1* | 5/2021 | Cheng ............... G06N 3/063 |
| 2021/0150002 A1* | 5/2021 | Cheng ............... H04L 9/3073 |
| 2021/0150406 A1* | 5/2021 | Cheng ............... G06F 21/12 |
| 2021/0150411 A1* | 5/2021 | Coenders ............ G06F 21/53 |
| 2021/0152600 A1* | 5/2021 | Cheng ............... H04L 63/12 |

OTHER PUBLICATIONS

Li et al., "DLBC: A Deep Learning-Based Consensus in Blockchains for Deep Learning Services", arxiv.org, Cornell University Library, 201 Olin Library Cornell University Ithaca, NY 14853, Apr. 16, 2019 (13 pages).

Li et al., "Merkle-Sign: Watermarking Framework for Deep Neural Networks in Federated Learning", arxiv.org, Cornell University Library, 201 Olin Library Cornell University Ithaca, NY 14853, Jul. 16, 2021 (13 pages).

\* cited by examiner

METHOD AND A SYSTEM FOR CHECKING OWNERSHIP AND INTEGRITY OF AN AI MODEL USING DISTRIBUTED LEDGER TECHNOLOGY (DLT)

This application is a 35 U.S.C. § 371 National Stage Application of PCT/EP2022/069875, filed on Jul. 15, 2022, which claims the benefit of priority to Serial No. IN 2021 4103 2309, filed on Jul. 19, 2021 in India, the disclosures of which are incorporated herein by reference in their entirety.

The following specification describes and ascertains the nature of this disclosure and the manner in which it is to be performed.

The present disclosure relates to a method of checking integrity and provenance of an AI model using distributed ledger technology (DLT) and a system thereof.

BACKGROUND

With the advent of data science, data processing and decision making systems are implemented using artificial intelligence modules. The artificial intelligence modules use different techniques like machine learning, neural networks, deep learning etc. Most of the AI based systems, receive large amounts of data and process the data to train AI models. Trained AI models generate output based on the use cases requested by the user. Typically the AI systems are used in the fields of computer vision, speech recognition, natural language processing, audio recognition, healthcare, autonomous driving, manufacturing, robotics etc. where they process data to generate required output based on certain rules/intelligence acquired through training.

To process the inputs and give a desired output, the AI systems use various models/algorithms which are trained using the training data. Once the AI system is trained using the training data, the AI systems use the models to process the data and generate appropriate result. The models in the AI systems form the core of the system. Lots of effort, resources (tangible and intangible), and knowledge goes into developing these models. It is possible that some adversary may try to steal/extract or modify the AI model when they are deployed in a public domain. Hence there is a need to ascertain the ownership and integrity of the AI model. Further in safety-critical systems, it is also pertinent to ascertain if the model running in the system is intended one or has been tampered with beyond repairable extent.

There are methods known in the prior arts about leveraging neural network plasticity to embed watermarks to prove its origin or ownership. Patent application US2019370440 AA titled "Protecting deep learning models using watermarking" discloses a framework to accurately and quickly verify the ownership of remotely deployed deep learning models is provided without affecting model accuracy for normal input data. The approach involves generating a watermark, embedding the watermark in a local deep neural network (DNN) model by learning, namely, by training the local DNN model to learn the watermark and a predefined label associated therewith, and later performing a black-box verification against a remote service that is suspected of executing the DNN model without permission. The predefined label is distinct from a true label for a data item in training data for the model that does not include the watermark. Black-box verification includes simply issuing a query that includes a data item with the watermark, and then determining whether the query returns the predefined label.

However, there is a need to not only verify the ownership and origin but also the integrity of an AI model.

SUMMARY

According to an exemplary embodiment of the disclosure, a method for determining ownership and integrity of an artificial intelligence (AI) model uses distributed ledger technology (DLT). The method includes embedding a digital watermark in an AI model during training of the AI model using first watermark data and a predefined output of the first watermark data, and generating a full checksum and a selective checksum for the AI model. The method further includes registering the AI model on a distributed ledger (DL) by uploading the full checksum, the selective checksum, the first watermark data, and at least the predefined output of the first watermark data, and receiving a unique model identification (ID) upon the registration. The method also includes receiving the AI model, the unique model ID of the AI model, and at least the first watermark data as an input, and checking for registration of the AI model by matching the received model ID with a stored model ID on the DL. Additionally, the method includes processing the first watermark data to get a processed output and matching the processed output with the predefined output, verifying the full checksum and at least one of the selective checksum of the AI model, calculating an error for the AI model based on the at least one selective checksum verification, and determining the integrity of the AI model based on the calculated error.

BRIEF DESCRIPTION OF THE DRAWINGS

An embodiment of the disclosure is described with reference to the following accompanying drawings.

DETAILED DESCRIPTION

Figure 1:
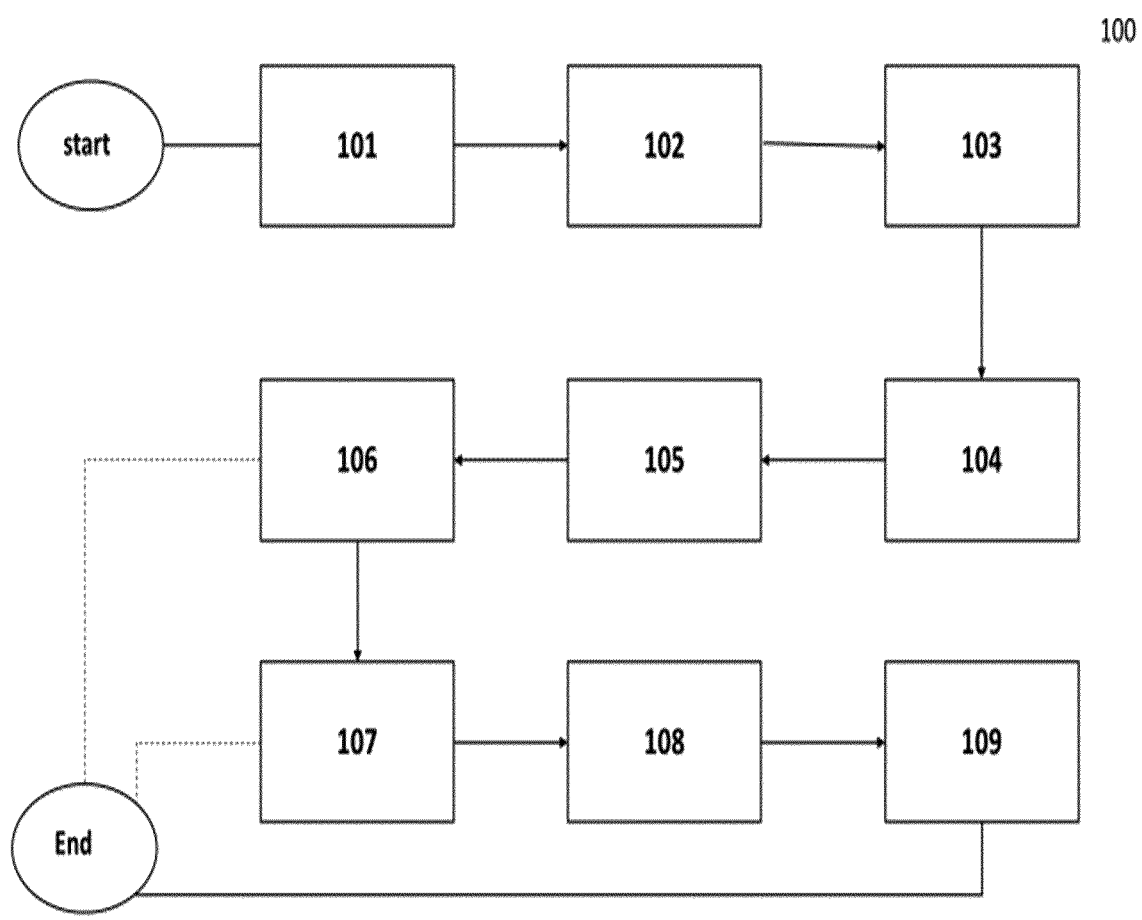
FIG. 1 illustrates method steps for checking ownership and integrity of an AI model using distributed ledger technology (DLT)

Some important aspects of the AI technology and AI systems can be explained as follows. Depending on the architecture of the implements AI systems may include many components. One such component is an AI module. An AI module with reference to this disclosure can be explained as a component which runs a model. A model can be defined as reference or an inference set of data, which is use different forms of correlation matrices. Using these models and the data from these models, correlations can be established between different types of data to arrive at some logical understanding of the data. A person skilled in the art would be aware of the different types of AI models such as linear regression, naïve bayes classifier, support vector machine, neural networks and the like. A person skilled in the art will also appreciate that the AI module may be implemented as a set of software instructions, combination of software and hardware or any combination of the same.

Some of the typical tasks performed by AI systems are classification, clustering, regression etc. Majority of classification tasks depend upon labeled datasets; that is, the data sets are labelled manually in order for a neural network to learn the correlation between labels and data. This is known as supervised learning. Some of the typical applications of classifications are: face recognition, object identification, gesture recognition, voice recognition etc. Clustering or grouping is the detection of similarities in the inputs. The cluster learning techniques do not require labels to detect similarities. Learning without labels is called unsupervised learning. Unlabeled data is the majority of data in the world. One law of machine learning is: the more data an algorithm can train on, the more accurate it will be. Therefore, unsupervised learning models/algorithms has the potential to produce accurate models as training dataset size grows.

As the AI module forms the core of the AI system, the module needs to be protected against attacks or undesirable modifications. The key idea here is to leverage the existing watermarking mechanism and tie it up with Distributed Ledger Technology (DLT) to generate proof of origin/ownership and integrity in a tamper-proof way. A person skilled in the art would understand that DLT are a consensus of digitized, decentralized & replicated append only digital data geographically spread across multiple locations. These decentralized, digitally managed ledgers have the capacity to distribute information with a high level of transparency and security. These distributed ledgers also act as a form of digital notary for a data providing immutable and indisputable information regarding the data.

Blockchain is one type of a distributed ledger. Blockchain organizes data into blocks, which are chained together in an append only mode. Once a transaction is initiated on blockchain, data is packaged in a "block". The block of data contains the data and its metadata for example in case of a blockchain, the hash value of the preceding block of data. The block is sent to all members on the network linked by the blockchain for their consensus and approval. The consensus and approval between the members on the network can happen through a number of decentral consensus mechanisms. Once a consensus is given the block is added to the chain and this update is shared between the members on the network.

FIG. 1 illustrates method steps (100) for checking ownership and integrity of an AI model using distributed ledger technology (DLT). The method step (100) by means of system comprising a plurality of processing nodes linked by a distributed ledger over a network and at least an AI model. Method step 101 comprises embedding a digital watermark in an AI model during training of the AI model using a first watermark data and its predefined output. This is accomplished by training the neural network model to learn the watermark by means a predefined label associated with a modified input.[1]

[1] Zhang. J., Gu. Z., Jang. J., Wu, H., Stoecklin, M. P., Huang. H. and Molloy. I., 2018, May. Protecting intellectual property of deep neural networks with watermarking. In *Proceedings of the 2018on Asia Conference on Computer and Communications Security* (pp. 159-172).

The method steps (100) are characterized by the following steps. Method step 102 comprises generating a full and selective checksums for the AI model. A checksum defined as a small-sized block of data derived from another block of digital data for the purpose of detecting errors that may have been introduced during its transmission or storage. A checksum is created by running an algorithm on a piece of data, which produces a checksum number, often called a hash. The hash can then be sent along with the original set of data. The receiver of the data can then use the hash to verify with a high probability that the data has not been altered or corrupted. In the context of this disclosure the data corresponds to the AI model to be registered on a distributed ledger.

The selective checksum may correspond to one of the many selection schemes, for example a scheme that generates checksum only for memory location that are multiples of a particular number. The training of the AI model is modified to generate the unique checksum of the new model using selective hashing techniques, to store on DLT along with model identification number. Method step 103 comprises registering the AI model on the distributed ledger (DL) by uploading full checksum, selective checksums, watermark data and at least the predefined output of the watermark data, a unique model ID is received upon registration. Method step 101-103 basically pertain to the registration of the AI model on the DL in a desired manner.

Once the model is registered on a DL, it's ownership can be verified along with the determination of integrity of the AI model. These method steps are performed by any one of the processing nodes in the network linked by DLT. Method step 104 comprises receiving the AI model, model ID of the AI model and at least its watermark data as input. Method step 105 comprises checking for registration of AI model by matching received model ID with a stored model ID on the DL. Method step 106 comprises processing the watermark data to get an output and matching the processed output with the predefined output. Matching of model ID and matching of the processed output with the predefined output indicates positive acknowledgment of the ownership of the AI model.

Method step 107 comprises verifying the full and selective checksums of the AI model. The sequence of numbers in the full or selective checksums are held or generated by various processing nodes of the DL. Hence the checksum gives AI model a dependency on the DL. During verification if the full checksum verification fail, it means the integrity of the AI model is compromised. Positive acknowledgment of ownership followed by a full checksum verification indicates complete integrity of the AI model. The selective checksums are verified only if the full checksum verification fails.

Method step 108 comprises calculating an error for the AI model based on said selective checksum verification. A rate of error is calculated based on the percentage or portion of checksum that matches with the checksum generated for the AI model in method step 102. A minimum threshold of error is defined beyond which the AI model is said to be tampered. Error Threshold is decided based on model criticality and type of model. The calculation of error is done in many ways based on the output of the model. As an example, if watermark queries response is matched to that of original model response for >95% cases, the model is not considered tempered and does not have any impact on functionality. However, if model under verification produces response that of <90%, the model is considered as compromised and can result in high error. Final step 109 comprises determining the integrity of the AI model based on the calculated error. The rate of error decides a partial or no integrity of AI model suggestive of tampering of the AI model.

Figure 2:
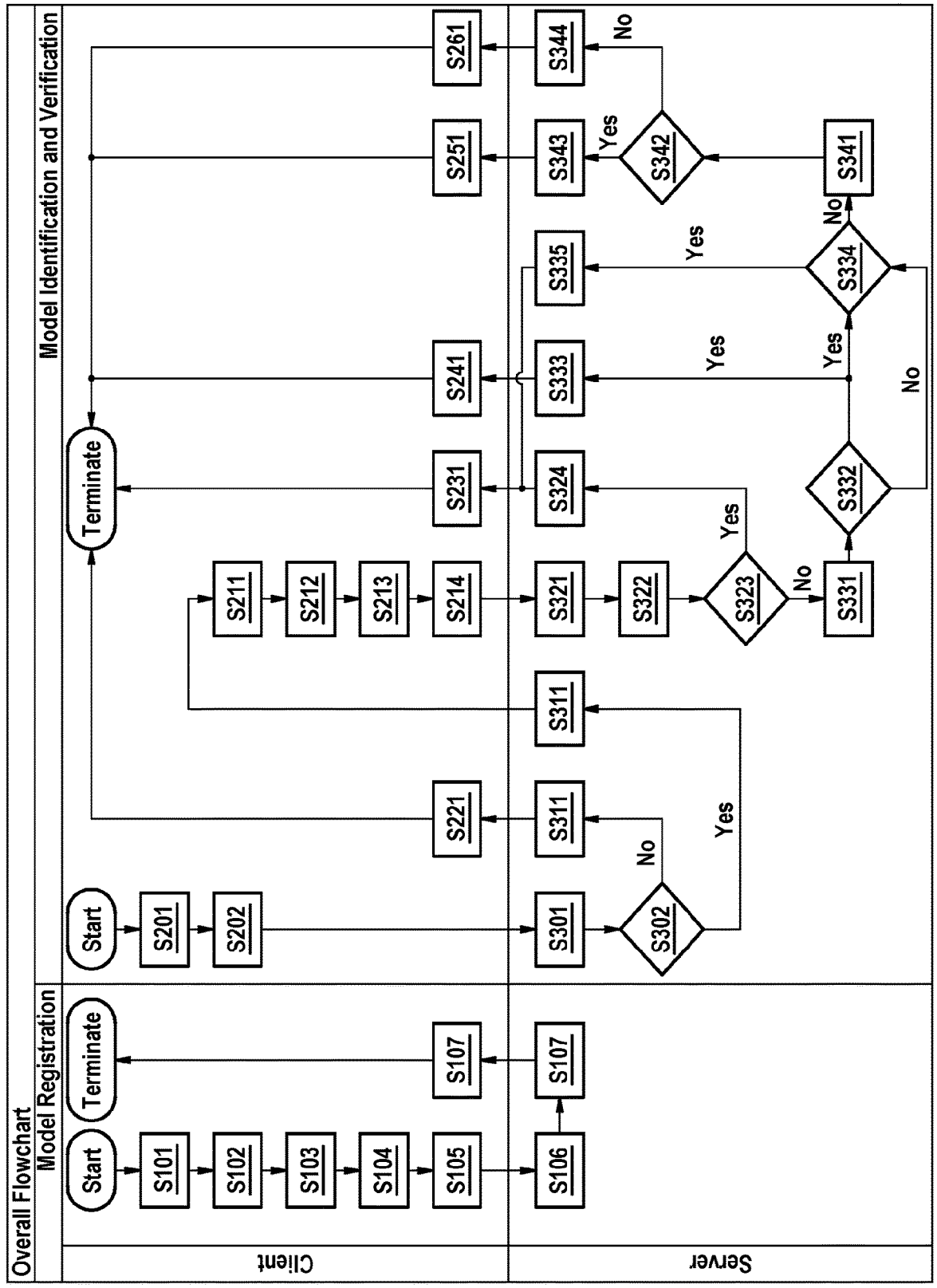
FIG. 2 depicts the proposed system architecture for checking integrity of an AI model using distributed ledger technology (DLT) and a flow chart thereof.

FIG. 2 depicts the proposed system architecture for checking integrity of an AI model using distributed ledger technology (DLT) and a flow chart thereof. The proposed system architecture is configured to carry out steps elaborated in accordance with method steps 100. The system comprises a plurality of processing nodes linked by a distributed ledger over a network and at least an AI model embedded with a digital watermark during training of the AI model using a first watermark data and its predefined output. The Server-side here represents DLT implementation comprising the plurality of decentralized processing nodes. The system is configured to: Generate a full and selective checksums for the AI model; Register the AI model on the distributed ledger (DL) by uploading full checksum, selective checksums, watermark data and at least the predefined output of the watermark data, a unique model ID is received upon registration; receive the AI model, model ID of the AI model and at least its watermark data as input; check for registration of AI model by matching received model ID with a stored model ID on the DL; process the watermark data to get an output and matching the processed output with the predefined output; verify the full and selective checksum of the AI model; calculate an error for the AI model based on said selective checksum verification; determine the integrity of the AI model based on the calculated error. All in accordance with description provided for method steps 100.

The flow chart depicted in FIG. 2 is explained by means of the following detailed step by step implementation of the method steps (100).

| Process Step No. | Step Description |
| --- | --- |
| | Model Registration |
| S101 | ID Generation and embedding in model metadata |
| S102 | Full Checksum Generation |
| S103 | Selective Checksums Generation |
| S104 | Watermark Processing |
| S105 | Send a request to DLT with full checksum, selective checksums along with selection schemes, watermark data and output of watermark data |
| S106 | Registering on DLT and uploading full checksum, selective checksum along with selection scheme, watermark data and output of watermark data |
| S107 | Provide positive acknowledgement of registration |
| S108 | Update metadata of the model with the flag that it is registered and terminate |
| | Client Model Identification and verification Request |
| S201 | Fetch Metadata of Model to get the ID of the model |
| S202 | Send Model ID |
| S211 | Receive watermarking data |
| S212 | Process the watermarking data |
| S213 | Generate response of watermark data |
| S214 | Send the watermark response along with model and ID |
| S221 | If the server sends a negative response, then terminate the process |
| S231 | If the server sends a positive acknowledgement of ownership then continue to function (verification successful) |
| S241 | If the server sends partial ownership acknowledgement, generate an alert at client-side and terminate (Verification partially successful and it might not be intended, model) |
| S251 | If the server sends partial ownership with manipulation indication, then generate a flag. Notify user and if possible stop the model and ask for user/system intervention (Verification is partially successful and model is tampered with compromising integrity) |
| S261 | If the server sends negative ownership acknowledgement, then stop the model and put a system in safe mode as it is an indication that it is not intended model (Verification unsuccessful, model is changed) |
| | Server Model-identification and Verification |
| S301 | Request to provide watermark data received from the client along with ID |
| S302 | Check for ID match and find the corresponding watermark data |
| S303 | Send the watermark data |
| S311 | If ID is not matched, provide a negative response and terminate |
| S321 | Receive model and watermark response along with id |
| S322 | Calculate the full checksum of model |
| S323 | Verify it with stored checksum |
| S324 | If checksum match, provide full positive acknowledge of ownership and terminate |
| S331 | If the checksum is not matched, then do selective checksum calculation against the stored scheme of selection |
| S332 | Verify it with stored selective checksum |
| S333 | If checksum match, provide partial/tentative positive acknowledge of ownership and continue (possible to terminate) |
| S334 | Verify response to the watermark data |
| S335 | If a full match, provide full positive acknowledge of ownership and terminate |
| S341 | If not then calculate match error |
| S342 | Based on error rate decide a response |
| S343 | If match error is less than the threshold, then partial/tentative positive acknowledge of ownership with manipulation and terminate (also generate tampering alert against model) |
| S344 | If match error is greater than the threshold, then provide negative acknowledgement of ownership and terminate |

The key idea here is to leverage the state of the art watermarking mechanism and tie it up with DLT to generate proof of origin (provenance) in a tamper-proof way. On DLT, we store model metadata, model files and watermarking data as a whole. In case if DLT is unable to handle it, then off-chain storage mechanism can be used. The entire mechanism of verification can be implemented as a large smart contract or multiple smart contracts.

The sequence described on server-side can be implemented as a one large smart contract or a plurality of smart contracts. For example, S302, 323, S332, S334 and S342 represents the smart contracts. Additionally, if the AI model is tampered with then generate an appropriate alert to reduce system operation to a safe level. If the model is completely replaced, but metadata is the same then it is indicative that the model is replaced in an unauthorized way and hence stop the system operation.

It must be understood that the disclosure in particular discloses methodology for checking integrity of an AI model using distributed ledger technology (DLT). While these methodologies describe only a series of steps to accomplish the objectives, these methodologies are implemented in a manner which may be a combination of hardware, software and a combination thereof. Further the methodologies are not specific to any particular processing node of the DLT. Conventional techniques used to prove ownership of the AI model requires us to provide watermarking data and its corresponding label making it vulnerable to an adversary even in case of verification. Using the above described method steps (100) the verification process can made to be hidden and undisputable.

It must be understood that the embodiments explained in the above detailed description are only illustrative and do not limit the scope of this disclosure. Any modification to the method for checking integrity of an AI model using distributed ledger technology (DLT) and the system thereof are envisaged and form a part of this disclosure. The scope of this disclosure is limited only by the claims.

We claim:

1. A method for determining ownership and integrity of an artificial intelligence (AI) model using distributed ledger technology (DLT), wherein processing nodes of a plurality of processing nodes are linked by a distributed ledger (DL) over a network, and the method is performed by any one processing node of the plurality of processing nodes, the method comprising:
   embedding a digital watermark in the AI model, during training of the AI model, using first watermark data and a predefined output of the first watermark data;
   generating, by using a hashing technique, a full checksum and a selective checksum for the AI model;
   registering the AI model on the DL by uploading the full checksum, the selective checksum, the first watermark data, and at least the predefined output of the first watermark data;
   receiving, upon the registering of the AI model, a unique model identification (ID) of the AI model;
   receiving the AI model, the unique model ID of the AI model, and at least the first watermark data as an input;
   checking for registration of the AI model by matching the received unique model ID of the AI model with a stored model ID on the DL;
   processing the first watermark data to get a processed output and matching the processed output with the predefined output of the first watermark data;
   verifying the full checksum and the selective checksum of the AI model;
   calculating an error for the AI model based on the selective checksum verification; and
   determining the integrity of the AI model based on the calculated error.

2. The method as claimed in claim 1, wherein matching of the unique model ID of the AI model and the processing of the first watermark data indicates a positive acknowledgment of the ownership of the AI model.

3. The method as claimed in claim 2, wherein the positive acknowledgment of the ownership of the AI model and the full checksum verification indicates complete integrity of the AI model.

4. The method as claimed in claim 1, wherein the selective checksum is verified only when the full checksum verification fails.

5. The method as claimed in claim 1, wherein a rate of error decides a partial or no integrity of the AI model suggestive of tampering of the AI model.

6. A computer system for determining ownership and integrity of an artificial intelligence (AI) model using distributed ledger technology (DLT), the computer system comprising:
   a plurality of processing nodes linked by a distributed ledger (DL) over a network, each processing node of the plurality of processing nodes including a memory and a processor, wherein any one of the processing nodes of the plurality of processing nodes is configured to:
      embed a digital watermark in the AI model, during training of the AI model, using first watermark data and a predefined output of the first watermark data;
      generate, by using a hashing technique, a full checksum and at least one selective checksum for the AI model;
      register the AI model on the DL by uploading the full checksum, the at least one selective checksum, the first watermark data, and at least the predefined output of the first watermark data,
      receive a unique model ID of the AI model upon the registration of the AI model;
      receive the AI model, the unique model ID of the AI model, and at least the first watermark data as an input;
      check for registration of the AI model by matching the received unique model ID of the AI model with a stored model ID on the DL;
      process the first watermark data to get a processed output and match the processed output with the predefined output of the first watermark data;
      verify the full checksum and the at least one selective checksum of the AI model;
      calculate an error for the AI model based on the at least one selective checksum verification; and
      determine the integrity of the AI model based on the calculated error.

7. The computer system as claimed in claim 6, wherein matching of the unique model ID of the AI model and the processing of the first watermark data indicates positive acknowledgment of the ownership of the AI model.

8. The computer system as claimed in claim 7, wherein the positive acknowledgment of the ownership of the AI model and the full checksum verification indicates complete integrity of the AI model.

9. The computer system as claimed in claim 6, wherein the at least one selective checksum is verified only when the full checksum verification fails.

10. The computer system as claimed in claim 6, wherein a rate of error decides a partial or no integrity of the AI model suggestive of tampering of the AI model.

\* \* \* \* \*